United States Patent [19]
Johnson

[11] 3,721,132
[45] March 20, 1973

[54] INTERMITTENT DRIVE FOR CONVEYORS AND THE LIKE

[75] Inventor: Roy W. Johnson, Woodland, Calif.

[73] Assignee: Johnson Farm Machinery Co., Inc., Woodland, Calif.

[22] Filed: April 28, 1971

[21] Appl. No.: 138,024

[52] U.S. Cl. ............... 74/394, 74/231 C, 74/243 C
[51] Int. Cl. ....... F16h 35/02, F16g 1/28, F16h 55/30
[58] Field of Search ......... 74/231 C, 243 C, 393, 394

[56] References Cited

UNITED STATES PATENTS

| | | | |
|---|---|---|---|
| 3,364,770 | 1/1968 | Button et al. | 74/394 |
| 1,297,108 | 3/1919 | Cunningham | 74/242.11 A X |
| 2,825,125 | 3/1958 | Smith | 74/393 X |
| 3,308,753 | 3/1967 | Zenone | 74/393 X |
| 3,309,935 | 3/1962 | Jurny et al. | 74/393 |

Primary Examiner—Leonard H. Gerin
Attorney—Townsend and Townsend

[57] ABSTRACT

An intermittent drive for periodically varying the speed and, if desired, the direction of a driven member comprising a driven shaft and a drive shaft coupled via a belt, a chain or the like. The driven shaft is stationary while the drive shaft is mounted to a pivoting frame. A wheel disposed between the shafts and concentric with the pivot axis of the frame spreads apart the belt strands between the shafts and maintains the belts taut while the frame and the drive shaft pivot. The longitudinal speed of the belt is thus altered, and can be reversed, during each complete pivot cycle of the frame and the drive shaft to correspondingly vary the speed and the rate of rotation of the driven shaft.

13 Claims, 5 Drawing Figures

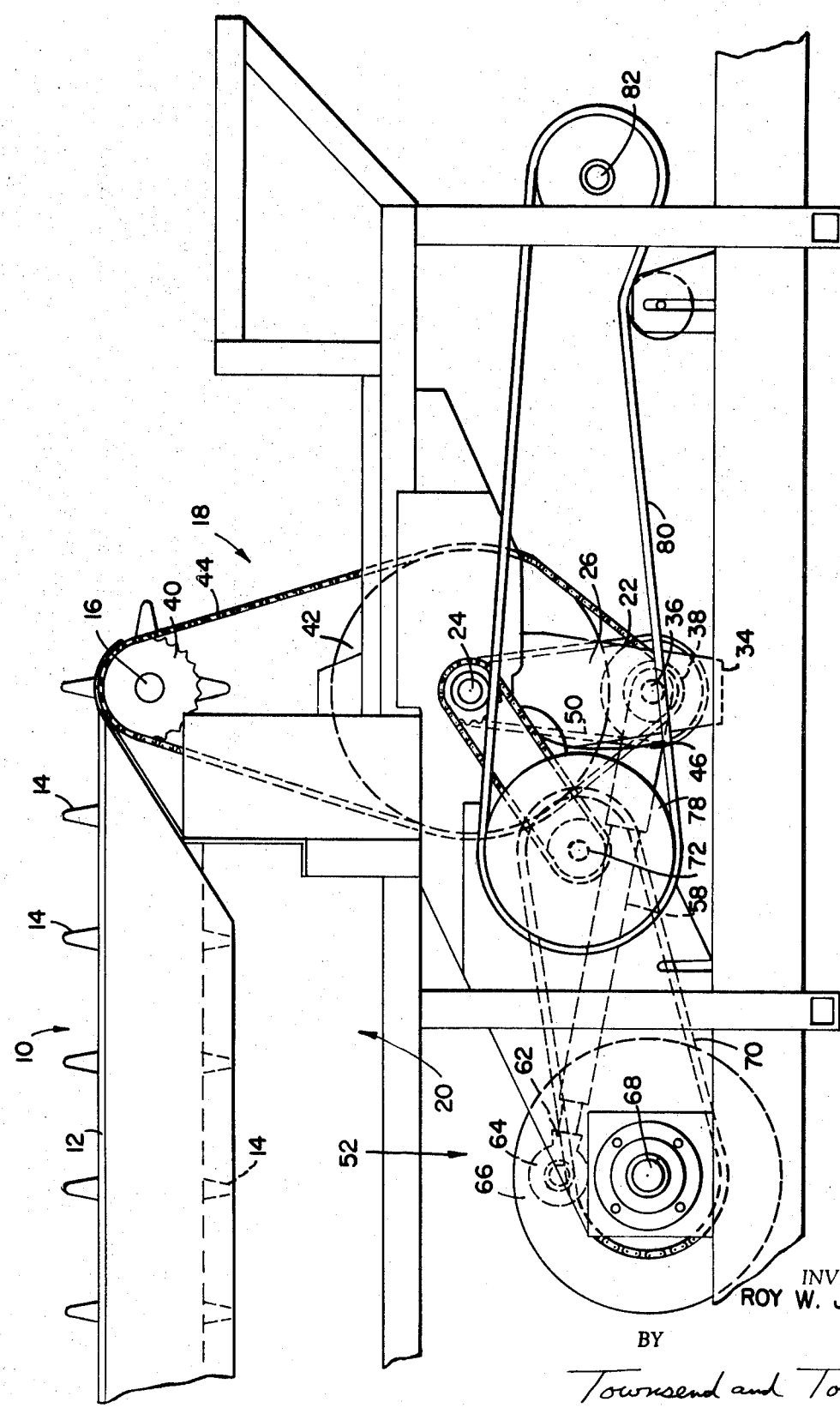

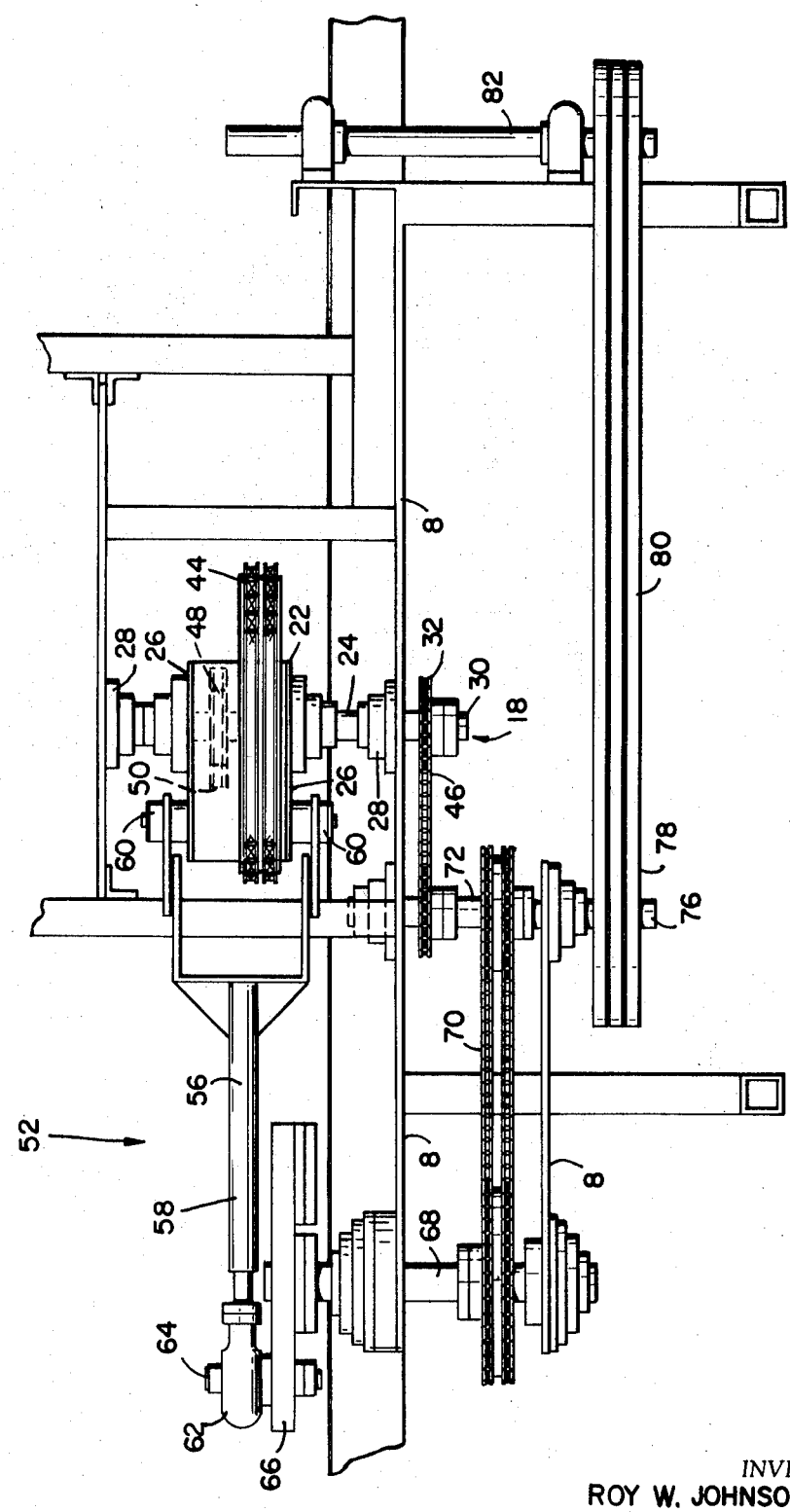

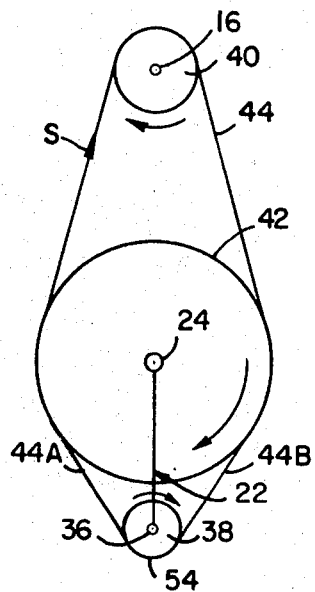
FIG_3
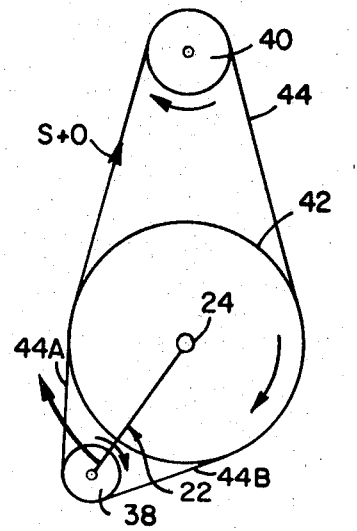
FIG_4
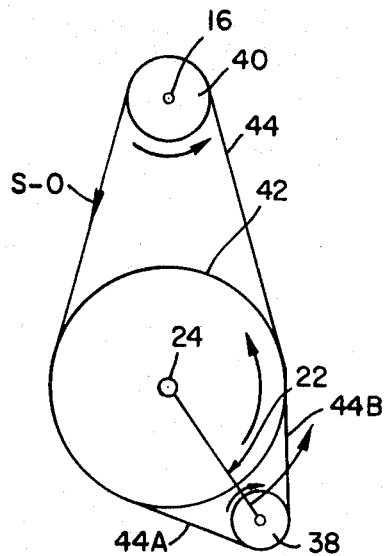
FIG_5

3,721,132

INTERMITTENT DRIVE FOR CONVEYORS AND THE LIKE

BACKGROUND OF THE INVENTION

It is sometimes necessary to provide a drive unit that periodically increases and decreases the speed of a driven member and, in some instances, even momentarily reverses the direction of movement of the member. A particular frequent application for such drives is found in known harvesting machines for transporting vegetables such as tomatoes and separating the tomatoes from their plants.

While the plants are on such a harvester they are carried by a conveyor and they must be repeatedly accelerated and decelerated to separate the tomatoes or the like from the plant. The conveyor itself is constructed so that the separated tomatoes can drop through the conveyor to a collection point. To obtain the necessary shaking of the tomatoes and their separation from the plants, it is preferred to actually reverse the direction of movement of the conveyor momentarily, that is for short periods of time, to obtain the desired high acceleration forces while maintaining a net forward movement of the conveyor.

Drive mechanisms which provide this cyclical variation in their speed and which even provide for the momentary reversal of their direction of movement are known. U. S. Pat. No. 3,364,770 describes and claims a periodically varying drive mechanism which exhibits the necessary ruggedness to enable the transmission of the appreciable power consumed by such harvester conveyors. Although the device of that last mentioned patent works entirely satisfactorily, the relatively large shock forces to which it is exposed in operation during each complete cycle tends to cause appreciable wear and tear and sometimes require the relatively frequent replacement of parts. Moreover, the device in that patent exhibited a substantial number of parts and was relatively expensive to construct. The design of that patent further permitted a reversal of the direction of rotation of only limited duration and magnitude, thereby limiting the maximum acceleration forces obtainable with the drive.

Other devices, such as the one illustrated in U. S. Pat. No. 3,548,669 are known. They generally work on the same principal as the drive shown in the earlier mentioned U. S. Pat. No. 3,364,770. Moreover, their construction does not lend such drives for the transmission of the large forces required in applications such as the above described harvester conveyor.

SUMMARY OF THE INVENTION

The present invention provides a drive mechanism for varying at least the rate of rotation of a driven shaft and, if desired, to also momentarily reverse its direction of rotation. The drive mechanism of the invention is rugged, simple to construct and therefore relatively inexpensive to build and use and requires little maintenance as compared to prior art drives. It is thus ideally suited for applications such as the above referred to tomato harvester although other applications for the intermittent drive mechanism of the present invention will come readily to mind to those skilled in the art.

Generally speaking, an intermittent drive constructed in accordance with the invention comprises a driven wheel secured to a shaft mounted to a relatively stationary support structure, a frame member, means for pivoting the frame member about a pivot axis, and a drive wheel-shaft assembly spaced from and parallel to the pivot axis. The wheel-shaft assembly is mounted to the frame member for pivotal movements therewith along a path concentric to the pivot axis. Continuous belt means is placed about the drive the driven wheels for imparting the drive wheel rotation to the driven wheel. Means is further provided for maintaining the belt means taut during pivotal movements of the frame member whereby the pivotal movements of the drive wheel accelerate the linear speed of the belt means when the frame member pivots in the direction of normal belt movements and decelerates the belt means when the frame member pivots in the opposite direction to thereby cyclically accelerate and decelerate and, if desired, reverse rotation of the driven wheel. This periodic variation of the driven wheel rotation is thus transmitted to the conveyor or the like that is actuated by the driven shaft.

As used in this specification, the terms "belt", "belt means" and "chain" include all means for operatively coupling a pair of spaced apart rotating shafts and thus include single and multiple flat belts, V-belts, chains, and the like.

In the preferred embodiment of the invention, the means maintaining the belt taut comprises a wheel rotatably mounted to a shaft defining the pivot axis of the frame. The wheel is positioned to engage the belt strands between the drive and the driven wheels and has a sufficient diameter to spread apart the strands and keep them taut. Irrespective of the relative position of the drive wheel, which pivots eccentrically with respect to the driven wheel so that their distance changes constantly, the belt is maintained taut. The portion of the belt between the spreader wheel and the drive wheel is merely moved in an arc concentric to the pivot axis, and therefore also to the spreader wheel, and it is maintained taut as long as the opposing belt strands are in contact with the spreader wheel. The portion of the belt between the spreader wheel and the driven wheel does not move. It, therefore, remains also taut.

In contrast to periodically varying drive mechanisms constructed in accordance with the prior art, the drive of the present invention transmits the drive shaft rotation past the pivot axis for the drive shaft to the driven shaft which does not coincide with the pivot axis but which is independently and immovably mounted to a main support structure. This enables the continuous rotation of the drive shaft through a power input drive that preferably actuates the drive shaft via a chain drive or the like from an input wheel concentric with the pivot axis and a separate and independent crank drive for pivoting the drive wheel and thereby cyclically varying the linear belt speed.

In the above referred to '669 patent, the drives for the pivotal and rotational movements of the drive wheel are actuated by one and the same mechanism. Aside from difficulties in constructing such mechanism, such a drive does not readily permit changing the frequencies of one or the other component because both are actuated from the same source. In the '770 patent, the sources for the pivotal and rotational movements of the drive shaft are independent and can, therefore, be readily independently varied to change their respective frequencies. However, the drive is relatively complicated, requires two separate, independent shafts that define the pivot axis for the drive wheel and is, as above stated, relatively expensive to construct and operate since it is subjected to substantial wear and tear, and requires frequent maintenance.

In contrast to the prior art drives, the drive of the present invention employs a simple pivotal frame that mounts the drive shaft and a continuous belt from the drive shaft past the pivot axis to the driven shaft. The construction of intermittent drives is thereby substantially simplified. The drive is capable of transmitting large forces without undue wear and tear from shock loads and the like on its various components. As compared to prior art devices it permits relatively larger pivotal movements of the support frame through a greater arc to increase the acceleration and deceleration forces and, if desired, the magnitude and duration of reversals in the rotation of the driven shaft substantially beyond that possible with prior art drives.

BRIEF DESCRIPTION OF THE DRAWINGS

FIG. 1 is a fragmentary, side elevational view of a conventional tomato harvester driven by a cyclically variable conveyor drive constructed in accordance with the invention;

FIG. 2 is a fragmentary plan view of a drive mechanism shown in FIG. 1; and

FIGS. 3 through 5 schematically illustrate the operation of the drive of the present invention and show its major components in three different locations during a complete cycle.

DESCRIPTION OF THE PREFERRED EMBODIMENTS

Referring to FIGS. 1 and 2, a harvester such as a tomato harvester 6 includes a support structure 8 carried on wheels (not shown) and having a shaker conveyor 10 at an upper portion of the harvester. The conveyor is defined by a plurality of laterally spaced conveyor chains 12 having fingers 14 for engaging tomato plants and generally transporting the plants to the right as seen in FIG. 1. The conveyor chains are advanced by a suitable drum which in turn is keyed or otherwise secured to a conveyor drive shaft 16 driven by a periodically varying drive mechanism 18 constructed in accordance with the invention. The drive mechanism is so constructed that it advances the conveyor chains a given distance to the right, as seen in FIG. 1, and then reverses the movement of the chains and moves them a lesser distance to the left in repetitive cycles. In this manner, the tomatoe plants on the conveyor are gradually discharged at the right-hand end of the conveyor. The continuous reversal of the chain movement subjects the plant to substantial acceleration and deceleration forces which shake tomatoes off the plant. The tomatoes then drop past the spaced apart conveyor chains to a collection point generally identified with the reference numeral 20.

Turning now to the construction of drive mechanism 18, it principally comprises a U-shaped frame or cage 22 that is pivotally secured to support structure 8 by a shaft 24. The shaft extends past upright end walls 26 of cage 22, is journaled in bearings 28 secured to the support structure and has one end 30 that mounts a chain sprocket 32.

A drive shaft 36 is journaled adjacent a lower end 34 of cage 22. A drive wheel 38 is secured to the drive shaft for rotation therewith. A driven wheel 40 is secured to conveyor drive shaft 16 and is positioned in substantially the same plane as the driven wheel 38 on shaft 36. A spreader wheel 42 is rotatably disposed on shaft 24 within upright walls 26 of cage 22 and is further aligned with the plane in which drive wheel 38 and driven wheel 40 are located. A continuous belt, chain 44 or the like is looped about wheels 38 and 40 and is spread apart by spreader wheel 42 which has a diameter substantially greater than either one of the drive and driven wheels.

Drive wheel 38 is driven via a chain drive 46 which rotates sprocket 32 and therewith shaft 24. Another sprocket 48 is keyed to shaft 24 adjacent spreader wheel 42 within the confines of plates 26 or cage 22 and actuates drive shaft 36 via a chain drive 50. This rotates drive wheel 38 and thus continuously and constantly moves chain 44 linearly to thereby rotate spreader wheel 42 and driven wheel 40.

Referring now to FIGS. 1 through 5, in actual operation, cage 22 is pivoted about the axis of shaft 24 by a crank mechanism 52 that reciprocates the cage about its neutral or center position shown in FIG. 3) to its limiting positions (shown in FIGS. 4 and 5). The constant rotation of the drive wheel 38 moves chain 44 in a clockwise direction at a constant speed "S". This in turn rotates driven wheel 40 at a constant rate determined by its pitch diameter. As crank mechanism 52 pivots cage 22 to the left towards the position shown in FIG. 4, the chain as a whole is additionally rotated in a clockwise direction at a speed "O" determined by the pivotable speed of the outermost periphery 54 of drive wheel 38. The belt speed "O" from pivotal movements of cage 22 is best visualized by considering drive wheel 38 non-rotatable. The pivotable movement of the cage to the left thus lengthens the lower portion 44B of the left-hand chain strand and shortens the lower portion 44A of the right-hand chain strand. The total length of the lower strand portions 44A and 44B remains constant and spreader wheel 42 maintains chain 44 taut. The instantaneous speed of the chain in a clockwise direction is thus S+O, with "O" being the instantaneous chain speed imparted to it by the pivotal movement of cage 22 to the left as indicated by the arrow in FIG. 4.

After the case reaches its left-hand dead point, crank mechanism 52 moves it to the right in the direction of the arrow in FIG. 5 towards the position shown in FIG. 5. The pivotal movement of the cage now moves chain 44 as a whole in a counterclockwise direction, as viewed in FIGS. 3 through 5, to lengthen strand portion 44A and shorten strand portion 44B. This counterclockwise movement of the chain offsets the continuous and constant clockwise chain movement imparted by the constant rotation of drive wheel 38 so that the instantaneous chain speed becomes S−O, wherein "O" is again the instantaneous chain speed imparted to it by the pivotal movement of cage 22.

It will be clear that the values for "S" and "O" can be selected to suit the particular requirement. It will also be clear that by sufficiently lengthening the pivotal arm of drive wheel 38 about shaft 24 "O max" can be selected to exceed "S" so that during that portion of the pivotal movement of the cage when it moves from the left to the right, as seen in FIGS. 3 through 5, the chain moves at least for a brief period of time opposite to the direction imparted to the chain by drive wheel 38. It is thus possible to select virtually any desirable drive characteristic for driven wheel 40 and to even reverse the direction of rotation thereof to thereby backstep conveyor chains 12 and to obtain the desired acceleration forces.

As an example of actual use of the drive mechanism of the present invention, which employed a spacing between shaft 24 and drive shaft 36 of about 12 inches, and a crank mechanism 52 having a total throw of 11 inches, and operating at a frequency of between about 2 to 5 per second, the conveyor chain moves about 3½ to 5 inches backwards, to the left, after having traveled forward, to the right, about 8 to 12 inches. The resulting acceleration and deceleration forces are sufficient to shake tomatoes from their plants for collection at 20. In that exemplary drive chain 44 comprised to ⅝ roller chain sets, drive wheels 38 had 15 teeth and spreader wheel 42 had a diameter of 18 inches.

Referring now again to FIGS. 1 and 2, crank mechanism 52 includes a forked connecting rod 58, the forked end of which is pivotally secured to studs 60 of drive shaft 36 protruding past end walls 26 of cage 22. A bearing (not separately shown) is provided to minimize friction wear between the studs and the forked end of the connecting rod.

The other end of the connecting rod is threaded to a head 62 rotatably retained to a throw pin 64 secured to a counter balanced crank plate 66. The crank plate is keyed to a shaft 68 journaled to support structure 8 and driven via a chain drive 70 from a common power transmission shaft 72. The power transmission shaft is again journaled to support structure 8 and mounts a sprocket 74 cooperating with the chain of of chain drive 46 rotating shaft 24. A free end 76 of the power transmission shaft mounts a V-belt sheave 78 which couples the power transmission shaft via V-belts 80 with a main power supply shaft 82.

Although the mechanism of the present invention is particularly suitable for driving an endless conveyor wherein compound motion with a net forward translation of movement is desired, it will be obvious that the mechanism has a myriad of other patterns of operations. Moreover, by judicious selection of the relative sizes of the elements in the drive mechanism and the frequency of pivoting cage 22 virtually any form of vibratory-translational motion can be provided. Furthermore, by incorporating variable speed drives such as gears or the like, a continuous and instantaneous variation in the relative amplitudes and/or frequency of pivoting the cage, or in the rate or rotation of the drive wheel can be achieved to provide the operator with means for continuously monitoring and changing the drive operation to adapt the driven member, say the conveyor, to changing operating conditions.

I claim:

1. An intermittent drive mechanism for varying at least the rate of rotation of a driven shaft comprising: a drive shaft, frame means, means journalling the drive shaft in the frame means, means for pivoting the frame means about a pivot axis spaced from and disposed between axes of the drive shaft and the driven shaft, continuous belt means connecting the drive shaft and the driven shaft for the simultaneous rotation of the shafts, and means concentric with the pivot axis and continuously engaging all strands of the belt means intermediate the shafts for translating pivotal movement of the drive shaft about the pivot axis into linear belt means speed to thereby change the effective linear belt speed and at least the rate of rotation of the driven shaft.

2. A mechanism according to claim 1 wherein the concentric means comprises wheel means, means mounting the wheel means for rotation about the pivot axis, wherein the driven shaft includes a driven wheel engaging the belt means, and wherein the wheel means diameter exceeds the diameter of the driven wheel.

3. A mechanism according to claim 1 wherein the concentric means comprises a wheel rotatable about the pivot axis.

4. A mechanism according to claim 1 wherein the driven shaft includes a drive wheel engaging the belt means, wherein the pivoting means comprises a crank drive operatively coupled to the frame means, and including means rotating the drive wheel at a constant speed, means for actuating the crank drive to pivot the frame means so that the linear speed of the belt means imparted by the crank drive is at least once during each complete cycle of the crank drive greater than the linear belt means speed imparted by the drive wheel to thereby obtain periodic reversals of the direction of movement of the belt means and, thereby of the driven shaft.

5. A periodic drive comprising: a support structure, a frame pivotally mounted to the structure, means reciprocating the frame about its pivot axis, a drive wheel spaced from and positioned on one side of the pivot axis and rotatably mounted to the frame, means for continuously driving the drive wheel, a driven wheel rotatably mounted to the support structure in substantial planar alignment with the drive wheel and positioned at the other side of the pivot axis, continuous belt means interconnecting the wheels, and means disposed between the drive wheel and the driven wheel for spreading the belt means in the vicinity of the pivot axis and causing a cyclical variation of the relative speed of the belt means, and thereby of the rate of rotation of the driven wheel, in response to pivotal movements of the frame.

6. A drive according to claim 5 wherein the spreading means includes means for maintaining the spacing between opposing belt means strands at the pivot axis constant irrespective of the relative position of the frame during its pivotal movement.

7. A cyclically variable drive for a driven shaft including a driven wheel secured to the shaft and mounted to a relatively stationary support structure comprising: a frame member, means for pivoting the frame member about a pivot axis, a drive wheel-shaft assembly spaced from and parallel to the pivot axis and mounted to the frame member, means for rotating the assembly, continuous belt means placed about the wheels for imparting drive wheel rotation to the driven wheel, and means for maintaining the belt means taut during pivotal movements of the frame member and the drive wheel about the pivot axis.

8. A drive according to claim 7 wherein the maintaining means comprises substantially cylindrical means mounted concentrically with the pivot axis for simultaneously and continually engaging all belt means strands between the wheels.

9. A drive according to claim 8 wherein the cylindrical means is defined by a rotatably mounted wheel positioned to spread opposing belt means strands.

10. A drive mechanism for shaker conveyors and the like actuated by a member rotatably mounted to a main conveyor support frame comprising generally U-shaped cage means, means pivotally mounting the cage means to the frame for pivotal movements of the cage means about an axis spaced from and parallel to the rotatable member, crank means for cyclically pivoting the cage means about the pivot axis, a drive wheel-shaft assembly rotatably mounted to the cage means, means for rotating the drive means at a substantially constant rate, continuous belt means connecting the drive wheel with a driven wheel on the rotatable member, and a spreader wheel engaging the strands of the belt means between the drive wheel and the driven wheel and having a sufficient diameter to assure contact between the spreader wheel and the strands in all positions of the drive wheel during a complete pivot cycle of the cage means to assure belt means tautness at all times and thereby varying the effective speed of the belt means at the driven wheel and the rate of rotation of the driven wheel in response to the pivotal movements of the cage means.

11. A drive according to claim 10 including means providing the belt means with a greater momentary relative speed due to pivotal movements of the cage means than the relative belt means speed imparted by the drive means to thereby momentarily reverse the direction of rotation of the driven wheel once during each complete pivot cycle.

12. A drive according to claim 10 wherein a pitch diameter of the driven wheel is greater than a pitch diameter of the drive wheel.

13. Apparatus according to claim 10 including means for pivotally connecting the crank means to the drive shaft of the assembly.

* * * * *